(12) United States Patent
Fujiki et al.

(10) Patent No.: US 11,316,770 B2
(45) Date of Patent: Apr. 26, 2022

(54) ABNORMALITY DETECTION APPARATUS, ABNORMALITY DETECTION METHOD, AND ABNORMALITY DETECTION PROGRAM

(71) Applicant: NIPPON TELEGRAPH AND TELEPHONE CORPORATION, Tokyo (JP)

(72) Inventors: Naoto Fujiki, Tokyo (JP); Tomoyasu Sato, Tokyo (JP); Takeshi Nakatsuru, Tokyo (JP); Takuya Minami, Tokyo (JP); Masami Izumi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/059,186

(22) PCT Filed: May 28, 2019

(86) PCT No.: PCT/JP2019/021163
§ 371 (c)(1),
(2) Date: Nov. 25, 2020

(87) PCT Pub. No.: WO2019/230739
PCT Pub. Date: Dec. 5, 2019

(65) Prior Publication Data
US 2021/0218659 A1 Jul. 15, 2021

(30) Foreign Application Priority Data
May 30, 2018 (JP) .............................. JP2018-103876

(51) Int. Cl.
*G06F 15/173* (2006.01)
*H04L 43/16* (2022.01)
(Continued)

(52) U.S. Cl.
CPC ............ *H04L 43/16* (2013.01); *H04L 41/142* (2013.01); *H04L 43/062* (2013.01); *H04L 61/6022* (2013.01)

(58) Field of Classification Search
USPC .......................... 709/224, 223, 220, 231, 236
See application file for complete search history.

(56) References Cited

U.S. PATENT DOCUMENTS 8,005,009 B2   8/2011  McKee et al.
2007/0204060 A1  8/2007  Higuchi et al.
(Continued)

FOREIGN PATENT DOCUMENTS

JP   H08-237249 A    9/1996
JP   2007-336512 A   12/2007
JP   2015-154301 A   8/2015

OTHER PUBLICATIONS

The University of New Hampshire Interoperability Laboratory (UNH-IOL) (2016) "Ethernet switching protocols-filtering database conformance test suite," version 2 .1, [retrieved on Jun. 17, 2019], Internet <https://www.iol.unh.edu/sites/default/files/testsuites/bfc/FDB_conformance.pdf>.

*Primary Examiner* — Lan Dai T Truong

(57) ABSTRACT

An anomaly detection device includes a memory, and processing circuitry coupled to the memory and configured to acquire communication feature values of communication devices, calculate, for each transmission source MAC address included in the communication feature values acquired, a total value of the number of transmitted and received packets or a total value of the number of bytes, for each layer-2 switch connected to a corresponding communication device, and determine, for each transmission source MAC address, that a communication device corresponding to the transmission source MAC address is connected to a layer-2 switch whose total value of the number of transmit-
(Continued)

ted and received packets or total value of the number of bytes calculated is the largest.

7 Claims, 11 Drawing Sheets

(51) Int. Cl.
  *H04L 41/142* (2022.01)
  *H04L 43/062* (2022.01)
  *H04L 101/622* (2022.01)

(56) References Cited

U.S. PATENT DOCUMENTS

2007/0271374 A1  11/2007  Shomura et al.
2013/0073706 A1* 3/2013  Iijima .................... H04L 67/18
                                              709/223

\* cited by examiner

Fig. 4

| ITEM NUMBER | FEATURE VALUE ITEM |
|---|---|
| 1 | TRANSMISSION SOURCE MAC ADDRESS |
| 2 | TRANSMISSION DESTINATION MAC ADDRESS |
| 3 | TRANSMISSION SOURCE IP ADDRESS |
| 4 | TRANSMISSION SOURCE PORT NUMBER |
| 5 | TRANSMISSION DESTINATION IP ADDRESS |
| 6 | TRANSMISSION DESTINATION PORT NUMBER |
| 7 | PROTOCOL |
| 8 | UPSTREAM AVERAGE PACKET SIZE |
| 9 | UPSTREAM LARGEST PACKET SIZE |
| 10 | UPSTREAM SMALLEST PACKET SIZE |
| 11 | UPSTREAM AVERAGE FLOW RATE |
| 12 | DOWNSTREAM AVERAGE PACKET SIZE |
| 13 | DOWNSTREAM LARGEST PACKET SIZE |
| 14 | DOWNSTREAM SMALLEST PACKET SIZE |
| 15 | DOWNSTREAM AVERAGE FLOW RATE |

Fig. 5

| TRANSMISSION SOURCE MAC ADDRESS | SWITCH ID | NUMBER OF PACKETS | NUMBER OF BITES |
|---|---|---|---|
| XX:XX:XX:XX:XX:XX | A | 180 | 180000 |
| XX:XX:XX:XX:XX:XX | B | 100 | 100000 |
| YY:YY:YY:YY:YY:YY | A | 150 | 150000 |
| ⋮ | ⋮ | ⋮ | ⋮ |

Fig. 6

| SWITCH ID | TRANSMISSION SOURCE MAC ADDRESS |
|---|---|
| A | XX:XX:XX:XX:XX:XX |
| A | YY:YY:YY:YY:YY:YY |
| ⋮ | ⋮ |

Fig. 7

| TRANSMISSION SOURCE MAC ADDRESS | NON-COMMUNICATING TIME |
|---|---|
| A | 3:00 |
| D | 2:00 |
| ⋮ | ⋮ |

ABNORMALITY DETECTION APPARATUS, ABNORMALITY DETECTION METHOD, AND ABNORMALITY DETECTION PROGRAM

CROSS-REFERENCE TO RELATED APPLICATIONS

This application is a U.S. 371 Application of International Patent Application No. PCT/JP2019/021163, filed on 28 May 2019, which application claims priority to and the benefit of JP Application No. 2018-103876, filed on 30 May 2018, the disclosures of which are hereby incorporated herein by reference in their entireties.

TECHNICAL FIELD

The present invention relates to an anomaly detection device, an anomaly detection method, and an anomaly detection program.

BACKGROUND ART

In recent years, in a network to which communication devices such as IoT devices are connected, it is important to monitor traffic flowing through the network and detect a security failure, such as unauthorized access or virus infection. Conventionally, various devices for monitoring traffic flowing through networks have been proposed. For example, a technology for acquiring a communication packet flowing through a network and performing statistical processing and analysis on the acquired packet is known. Also known is a technology for mirroring and thus acquiring a packet and generating a communication feature value to detect an anomaly in a device through which a packet to be analyzed passes.

Regarding configuration management, i.e. management of a connection between a server and a network, a technology is conventionally known in which an external monitoring device is disposed, the monitoring device periodically performs polling of monitoring targets regardless of the state of the monitoring targets, and an agent disposed in each of the monitoring targets regularly transmits the state thereof to a host system that requires the monitoring target to do so.

CITATION LIST

Patent Literature

[Patent Literature 1] Japanese Laid-open Patent Publication No. 08-237249

SUMMARY OF THE INVENTION

Technical Problem

However, the conventional technologies have a problem in that it is difficult to appropriately and readily understand the connection status of a communication device. For example, in the case of communication devices such as IoT devices, it is assumed that a connection point in a network is changed, or a device is replaced with another one due to a failure or the like. It is therefore difficult to appropriately and readily understand the configuration when there are many devices. For this reason, it is difficult to automatically identify where a communication device has been connected or moved, as well as whether or not a communication device has been abandoned or replaced.

Note that a method is also conceivable in which an agent is introduced to manage configuration information regarding communication devices. However, a communication device such as an IoT device has few resources, and it is difficult to introduce an agent thereto.

Means for Solving the Problem

To solve the foregoing problem and achieve an object, an anomaly detection device according to the present invention includes: a memory; and processing circuitry coupled to the memory and configured to: acquire communication feature values of communication devices, calculate, for each transmission source MAC address included in the communication feature values acquired, a total value of the number of transmitted and received packets or a total value of the number of bytes, for each layer-2 switch connected to a corresponding communication device, and determine, for each transmission source MAC address, that a communication device corresponding to the transmission source MAC address is connected to a layer-2 switch whose total value of the number of transmitted and received packets or total value of the number of bytes calculated is the largest.

Also, an anomaly detection method according to the present invention is an anomaly detection method including: acquiring communication feature values of communication devices; calculating, for each transmission source MAC address included in the communication feature values acquired, a total value of the number of transmitted and received packets or a total value of the number of bytes, for each layer-2 switch connected to a corresponding communication device; and determining, for each transmission source MAC address, that a communication device corresponding to the transmission source MAC address is connected to a layer-2 switch whose total value of the number of transmitted and received packets or total value of the number of bytes calculated is the largest, by processing circuitry.

A non-transitory computer-readable recording medium stores therein an anomaly detection program according to the present invention, the anomaly detection program causing a computer to execute a process including: acquiring communication feature values of communication devices; calculating, for each transmission source MAC address included in the communication feature values acquired, a total value of the number of transmitted and received packets or a total value of the number of bytes, for each layer-2 switch connected to a corresponding communication device; and determining, for each transmission source MAC address, that a communication device corresponding to the transmission source MAC address is connected to a layer-2 switch whose total value of the number of transmitted and received packets or total value of the number of bytes calculated is the largest.

Effects of the Invention

An effect of appropriately and readily understanding the connection status of a communication device is achieved.

BRIEF DESCRIPTION OF DRAWINGS

FIG. 4 shows examples of communication feature values.

FIG. 5 shows an example of a connection determination list.

FIG. 6 shows an example of a processing list.

FIG. 7 shows an example of a non-communicating MAC address list.

DESCRIPTION OF EMBODIMENTS

An embodiment of an anomaly detection device, an anomaly detection method, and an anomaly detection program according to the present application will be described in detail with reference to the drawings. Note that the anomaly detection device, the anomaly detection method, and the anomaly detection program according to the present application are not limited by the embodiment.

First Embodiment

The following embodiment will describe a configuration of an anomaly detection system, a configuration of an anomaly detection device, and a flow of processing performed by the anomaly detection device according to the first embodiment in this order, and will describe effects of the first embodiment lastly.

[Configuration of Anomaly Detection System]

Figure 1:
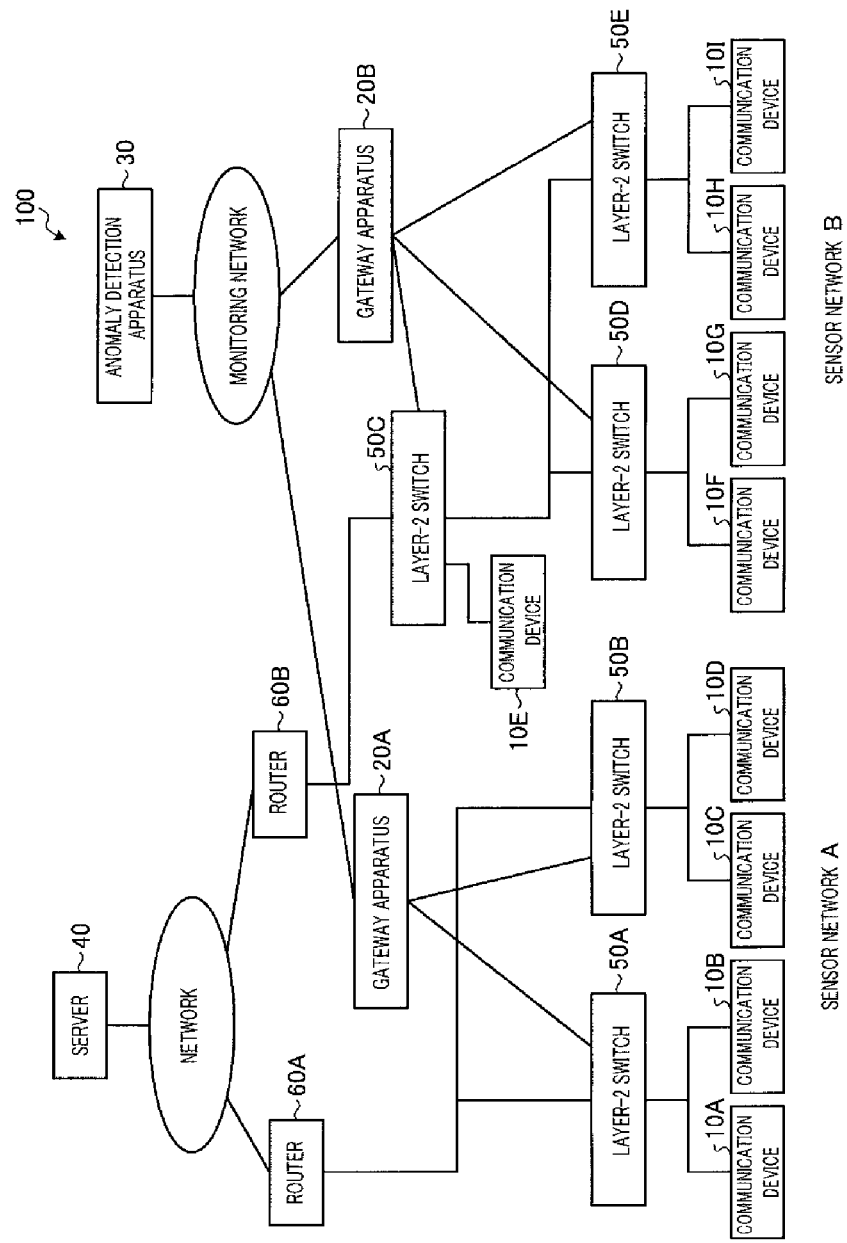
FIG. 1 shows an example of a configuration of an anomaly detection system according to a first embodiment.

First, an anomaly detection system 100 according to the first embodiment will be described with reference to FIG. 1. FIG. 1 is a diagram showing an example of a configuration of the anomaly detection system according to the first embodiment. The anomaly detection system 100 according to the first embodiment includes, for example, a plurality of communication devices 10A to 10I, a plurality of gateway devices 20A and 20B, an anomaly detection device 30, a server 40, a plurality of layer-2 switches 50A to 50E, and a plurality of routers 60A and 60B, as shown in FIG. 1.

The server 40 and the plurality of routers 60A and 60B are connected by a network, such as the Internet. The anomaly detection device 30 and the plurality of gateway devices 20A and 20B are connected by a monitoring network. Note that, when the communication devices 10A to 10I, the gateway devices 20A and 20B, the layer-2 switches 50A to 50E, and the routers 60A and 60B are described without any distinction, these devices will be referred to as communication devices 10, gateway devices 20, layer-2 switches 50, and routers 60, respectively.

The communication devices 10 are communication devices that are subjected to anomaly detection in the anomaly detection system. For example, the communication devices 10 are IoT devices in any of various environments such as a factory, a plant, a building, and a data center, and improve the efficiency in a social infrastructure system and realize factory automation by notifying the server 40 of sensor information regarding sensors installed in a facility or a machine.

The gateway devices 20 are devices that connect to mirror ports of the layer-2 switches 50, collect packet data on the communication devices 10 to generate communication feature values and operation logs, and transmit the generated communication feature values and operation logs to the anomaly detection device 30 via the monitoring network. The routers 60 are devices that connect the communication devices 10 to an external device (e.g. the server 40) via a network, such as the Internet, and connect the communication devices 10 to other communication devices 10 in a different LAN.

The anomaly detection device 30 learns behavior during a normal operation from the communication feature values and the operation logs obtained during the normal operation of the layer-2 switches 50 and the communication devices 10, stores the learning results, detects an anomaly, such as unauthorized access or virus infection, of the communication devices based on the communication feature values, and analyzes and monitors a connection status of the communication devices 10 using the communication feature values.

For example, the anomaly detection device 30 calculates an anomaly score, which indicates a degree of anomaly, for the communication feature values and the operation log of a communication device 10 that is to be analyzed, compares the calculated anomaly score with a preset determination threshold, and determines that the communication device 10 is normal if the anomaly score is smaller than the determination threshold, and determines that the communication device 10 is abnormal if the anomaly score is greater than the determination threshold.

Also, the anomaly detection device 30 automatically identifies a gateway device 20 and a port thereof to which the communication device 10 for which anomaly communication is monitored is connected (i.e. a layer-2 switch 50 to which this communication device 10 is connected) by performing statistical processing on the communication feature values, automatically detects that the communication device 10 has been disconnected, reconnected, or connected to another gateway device, and manages the configuration. Note that a configuration is employed in which a mirror port is set on every layer-2 switch 50 that are present on the network.

The server 40 is a device that is connected to the network, and is a device with which the communication devices 10 communicate, for example. For example, the server 40 receives sensor information from the communication devices 10. The layer-2 switches 50 are connected to the communication devices 10 and the routers 60, forward packets in the layer 2, capture packets at the communication devices 10, and output communication data to the gateway devices 20 through the mirror ports.

Figure 2:
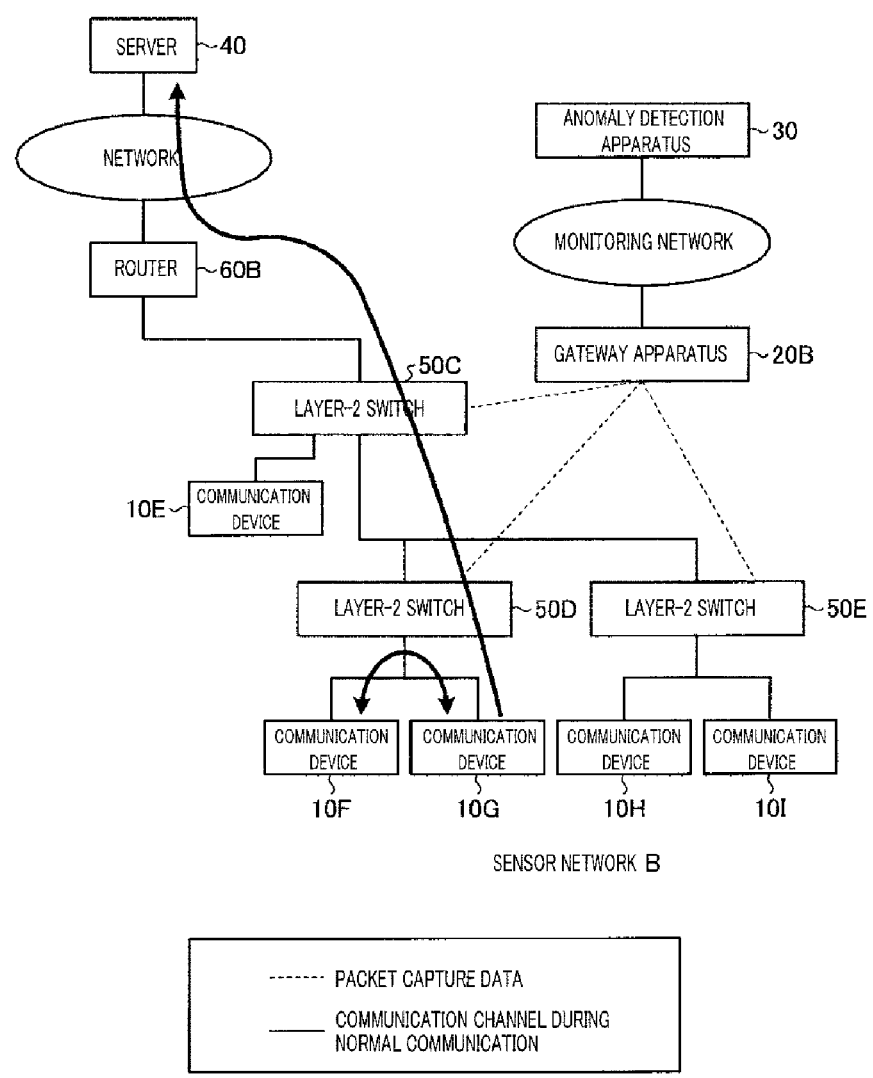
FIG. 2 is a diagram illustrating a communication pattern in mirror monitoring.

For example, as shown as an example in FIG. 2, the layer-2 switches 50C to 50E output packet capture data to the gateway device 20B. Also, when the communication device 10F communicates with the communication device G, communication data is transmitted and received via the layer-2 switch 50D, as shown as an example in FIG. 2. In this case, the layer-2 switch 50D captures packets, and outputs communication data to the gateway device 20B through its mirror port.

When the communication device 10G communicates with the server 40, communication data is transmitted and received via the layer-2 switch 50C, the layer-2 switch 50D, and the router 60B, as shown as an example in FIG. 2. In this case, the layer-2 switch 50C and the layer-2 switch 50D capture packets, and output communication data to the gateway device 20B through their mirror ports.

[Configuration of Anomaly Detection Device]

Figure 3:
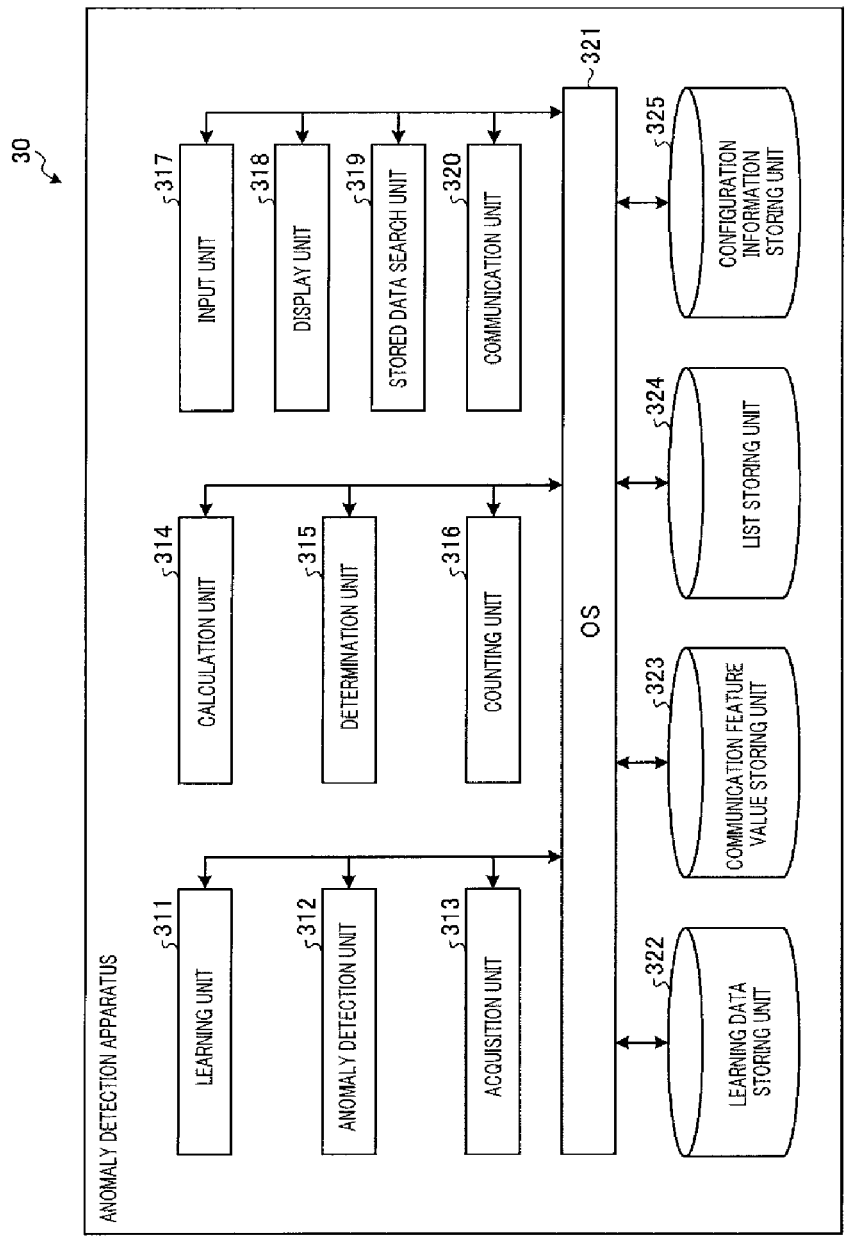
FIG. 3 is a block diagram showing an example configuration of an anomaly detection device according to the first embodiment.

Next, a configuration of the anomaly detection device 30 shown in FIG. 1 will be described with reference to FIG. 3. FIG. 3 is a block diagram showing an example configuration of the anomaly detection device according to the first embodiment. As shown in FIG. 3, the anomaly detection device 30 includes a learning unit 311, an anomaly detection unit 312, an acquisition unit 313, a calculation unit 314, a determination unit 315, a counting unit 316, an input unit 317, a display unit 318, a stored data retrieval unit 319, a communication unit 320, an OS 321, a learning data storing unit 322, a communication feature value storing unit 323, a list storing unit 324, and a configuration information storing unit 325. Processing performed by the respective units provided in the anomaly detection device 30 will be described below.

The learning unit 311 learns communication feature values obtained when the communication devices 10 are operating normally, through machine learning. For example, the learning unit 311 learns the communication feature values obtained when the communication devices 10 are normally operating, through machine learning using the communication feature values of the communication devices 10 stored in the communication feature value storing unit 323, and stores, as the learning results, the communication feature values obtained during the normal operation in the learning data storing unit 322.

The anomaly detection unit 312 detects an anomaly in the communication devices 10 based on the communication feature values obtained when the communication devices 10 are normally operating. For example, the anomaly detection unit 312 acquires the communication feature values of each of the communication devices 10 that are to be analyzed, from the communication feature value storing unit 323. The anomaly detection unit 312 then calculates, for the acquired communication feature values, an anomaly score for the communication feature values of each communication device 10, using the learning results from the learning unit 311. Thereafter, if the calculated anomaly score value is greater than or equal to a preset determination threshold, the anomaly detection unit 312 determines that an anomaly has occurred in the communication device 10. If the calculated anomaly score value is smaller than the preset determination threshold, the anomaly detection unit 312 determines that the communication device 10 is normally operating.

The acquisition unit 313 acquires the communication feature values of the respective communication devices 10. Specifically, the acquisition unit 313 acquires communication feature values of the communication devices from the gateway devices 20 at predetermined time intervals, acquires communication feature values that have been added since the last acquisition, stores the acquired communication feature values in the communication feature value storing unit 323, and creates a list of transmission source MAC addresses. As for the communication feature values (e.g. values of feature value items shown in FIG. 4) of the communication devices 10, a configuration may be employed in which the communication feature values regarding data transmission to and reception from the communication devices 10 are directly acquired from the gateway devices 20 and stored in the communication feature value storing unit 323. Alternatively, a configuration may be employed in which communication statistic data on data transmission to and reception from the communication devices 10 per predetermined time is acquired from the gateway devices 20, converted to the communication feature values in the anomaly detection device 30, and stored in the communication feature value storing unit 323.

Here, examples of the communication feature values are shown in FIG. 4. FIG. 4 shows examples of the communication feature values. As shown as an example in FIG. 4, items of the communication feature values include a transmission source MAC address, a transmission destination MAC address, 5-tuple information (transmission source IP address, transmission source port number, transmission destination IP address, transmission destination port number, protocol), upstream average package size, upstream largest packet size, upstream smallest packet size, upstream average flow rate, downstream average packet size, downstream largest packet size, downstream smallest packet size, and downstream average flow rate.

For each of the transmission source MAC addresses included in the communication feature values acquired by the acquisition unit 313, the calculation unit 314 calculates a total value of the number of transmitted and received packets or a total value of the number of bytes, for each of the layer-2 switches 50 that are connected to the corresponding communication devices 10. Note that, in the following description, the calculation unit 314 calculates both the total value of the number of transmitted and received packets and the total value of the number of bytes.

The determination unit 315 determines, for each transmission source MAC address, that the communication device 10 corresponding to the transmission source MAC address is connected to the layer-2 switch 50 whose total value of the number of transmitted and received packets or whose total value of the number of bytes calculated by the calculation unit 314 is the largest.

For example, a description is given using the example in FIG. 2. The calculation unit 314 calculates, for the transmission source MAC address of the communication device 10G, the total value of the number of packets transmitted to and received from the layer-2 switch 50C and the total value of the number of bytes, and the total value of the number of packets transmitted to and received from the layer-2 switch 50D and the total value of the number of bytes. In the case of the example in FIG. 2, regarding communication performed by the communication device 10G, the layer-2 switch 50D transfers data communicated with the communication device 10F and the server 40, whereas, regarding communication performed by the communication device 10G, the layer-2 switch 50C only transfers data communicated with the server 40. Thus, the total value of the number of packets transmitted to and received from the layer-2 switch 50D and the total value of the number of bytes are greater than the total value of the packets transmitted to and received from the layer-2 switch 50C and the total value of the number of bytes. That is to say, in the example in FIG. 2, the determination unit 315 determines that the communication device 10G is directly connected to the layer-2 switch 50D.

Thus, the anomaly detection device 30 can identify an observation point for the communication device 10G by determining that the communication device 10G is directly connected to the layer-2 switch 50D. That is to say, the anomaly detection device 30 receives, partially redundantly, communication data of the communication device 10G from both the layer-2 switch 50C and the layer-2 switch 50D. However, by determining that the communication device 10G is directly connected to the layer-2 switch 50D, it becomes clear that communication data of the communication device 10G can be fully monitored without redundancy by observing communication data of the communication device 10G from the layer-2 switch 50D.

If a later-described non-communicating time counted by the counting unit 316 has reached a predetermined time, the determination unit 315 determines that the communication device 10 with a transmission source MAC address whose non-communicating time has reached the predetermined time has stopped communication. If a communication device newly is connected to the layer-2 switch 50 that has been connected to the communication device 10 for which it is determined that communication has not occurred, before the non-communicating time counted by the counting unit 316 reaches the predetermined time, and if the number of communication devices for which it is determined that communication has not occurred matches the number of newly-connected communication devices, the determination unit 315 determines that a communication device has been replaced.

The determination unit 315 also updates configuration information, which include information regarding the connection state of the communication devices 10, in accordance with the determination results. Specifically, the determination unit 315 updates configuration information stored in the configuration information storing unit 325, in accordance with the determination results.

If there is a transmission source MAC address that is not included in the communication feature values acquired by the acquisition unit 313 but is included in the configuration information that includes information regarding the connection state of the communication devices 10, the counting unit 316 counts a non-communicating time for this transmission source MAC address.

The input unit 317 accepts input of various data stored in the storing units 322 to 325, requests to retrieve data stored in the storing units 322 to 325, and the like. For example, the input unit 317 accepts requests to retrieve the results of anomaly detection, configuration information, and the like.

The display unit 318 displays various data stored in the storing units 322 to 325 on a display device (not shown). For example, the display unit 318 displays the anomaly detection results and configuration information retrieved by the stored data retrieval unit 319 on the display device (not shown). If an anomaly in a communication device 10 is detected by the anomaly detection unit 312, the display unit 318 displays a network corresponding to a layer-2 switch 50 to which this communication device 10 is connected as a network to which the communication device 10 in which an anomaly has been detected belongs. Thus, an anomaly in the communication device 10 connected to the network can be detected, and the network to which the communication device 10 is connected can be identified.

The stored data retrieval unit 319 retrieves data stored in the storing units 322 to 325. For example, upon a request to retrieve configuration information being accepted by the input unit 317, the stored data retrieval unit 319 retrieves configuration information that matches the retrieval request, from the configuration information storing unit 325.

The communication unit 320 governs interfaces for communication with external devices. For example, the communication unit 320 accepts input of the communication feature values of the communication devices 10 acquired via the gateway devices 20, communication statistic data, and packet data.

The OS 321 manages and controls the learning unit 311, the anomaly detection unit 312, the acquisition unit 313, the calculation unit 314, the determination unit 315, the counting unit 316, the input unit 317, the display unit 318, the stored data retrieval unit 319, the communication unit 320, the OS 321, the learning data storing unit 322, the communication feature value storing unit 323, the list storing unit 324, and the configuration information storing unit 325.

The learning data storing unit 322 stores the communication feature values of the communication devices 10 learned by the learning unit 311 as the communication feature values obtained during normal operation. The communication feature value storing unit 323 stores the communication feature values of the communication devices 10. This communication feature values are used in learning performed by the learning unit 311, and anomaly detection performed by the anomaly detection unit 312.

Figure 8:
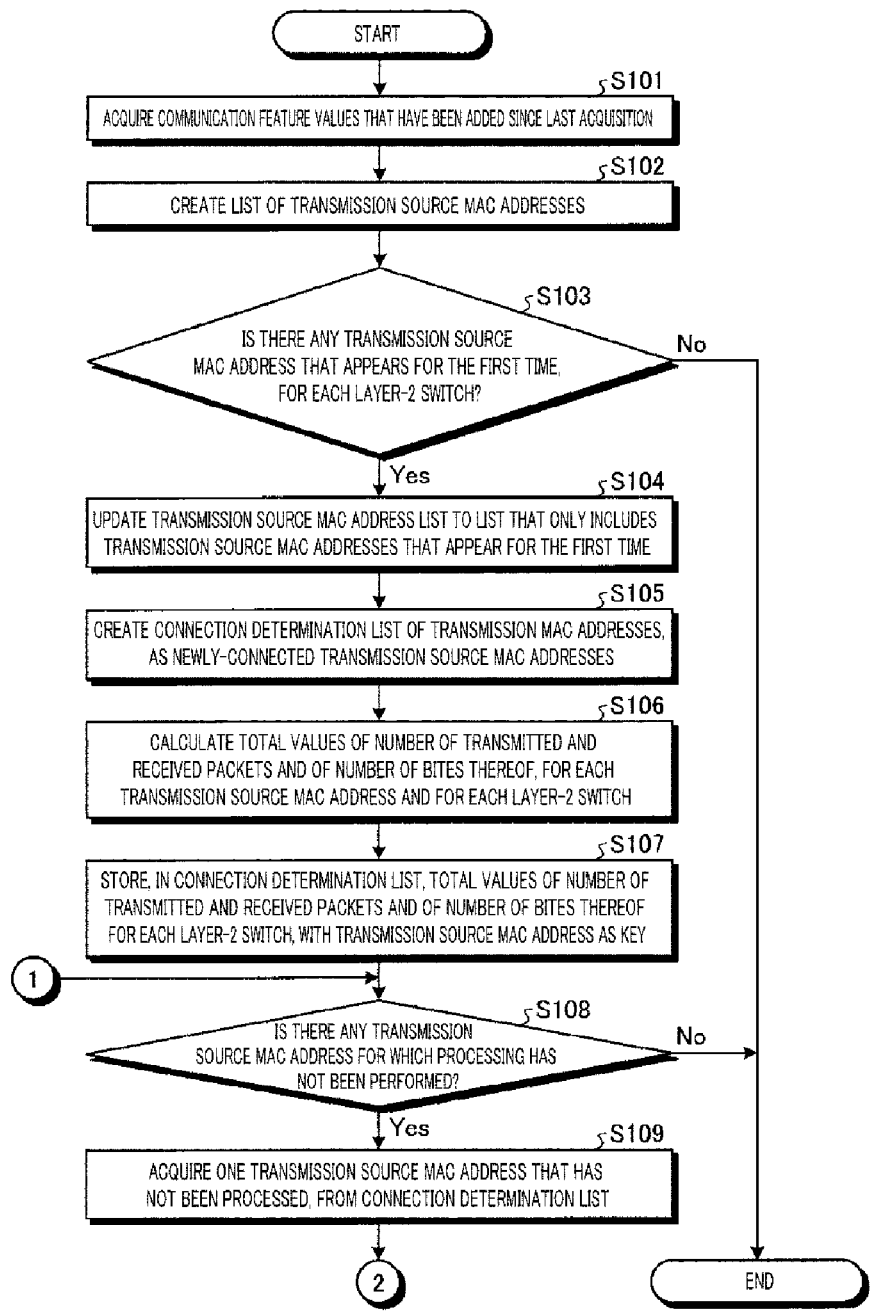
FIG. 8 is a flowchart illustrating connection processing performed by the anomaly detection device according to the first embodiment.
Figure 9:
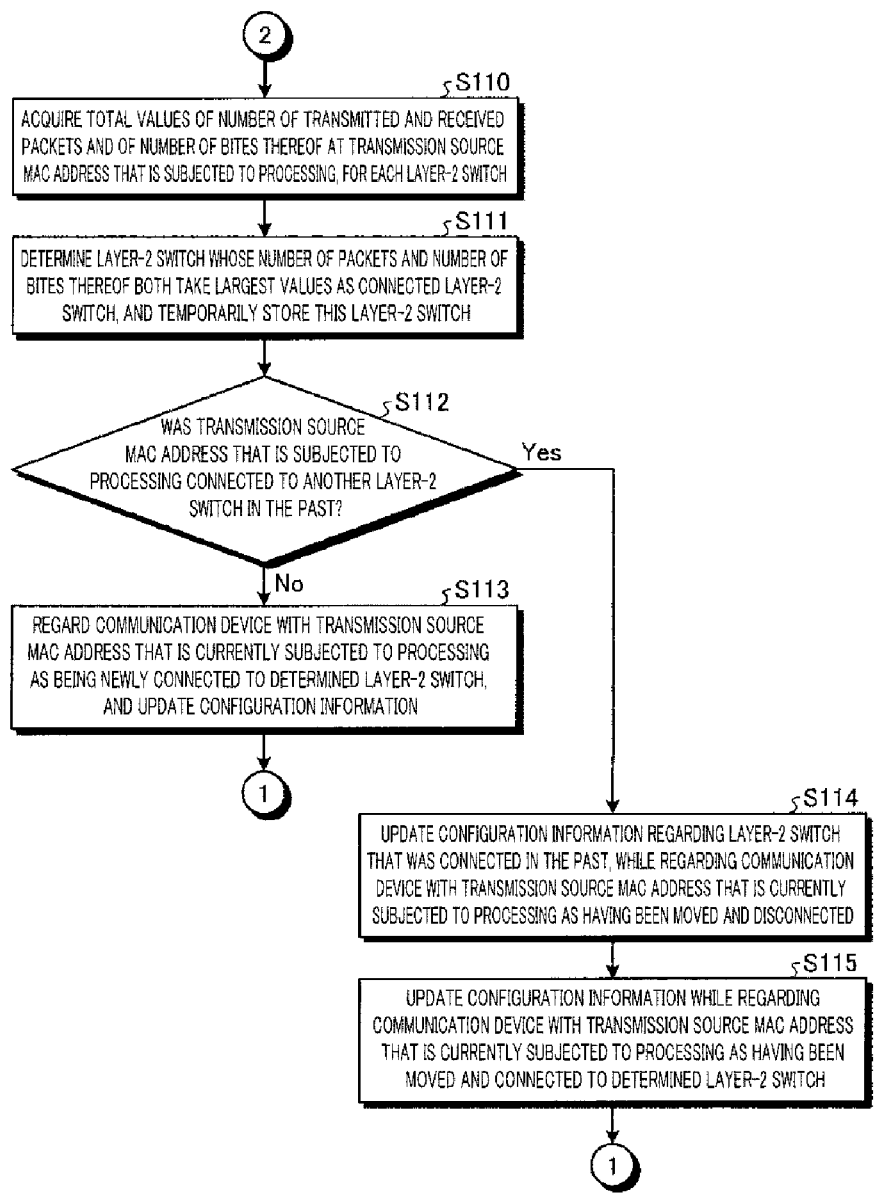
FIG. 9 is a flowchart illustrating connection processing performed by the anomaly detection device according to the first embodiment.

The list storing unit 324 stores a connection determination list, which indicates transmission source MAC addresses that are newly connected to the layer-2 switches 50, as a determination target in connection determination processing (see FIGS. 8 and 9). For example, the connection determination list stores "the number of transmitted and received packets" and "the number of bytes" in association with "transmission source MAC addresses" and "switch IDs", which are IDs of the layer-2 switches 50, as shown as an example in FIG. 5. FIG. 5 shows an example of the connection determination list.

Figure 10:
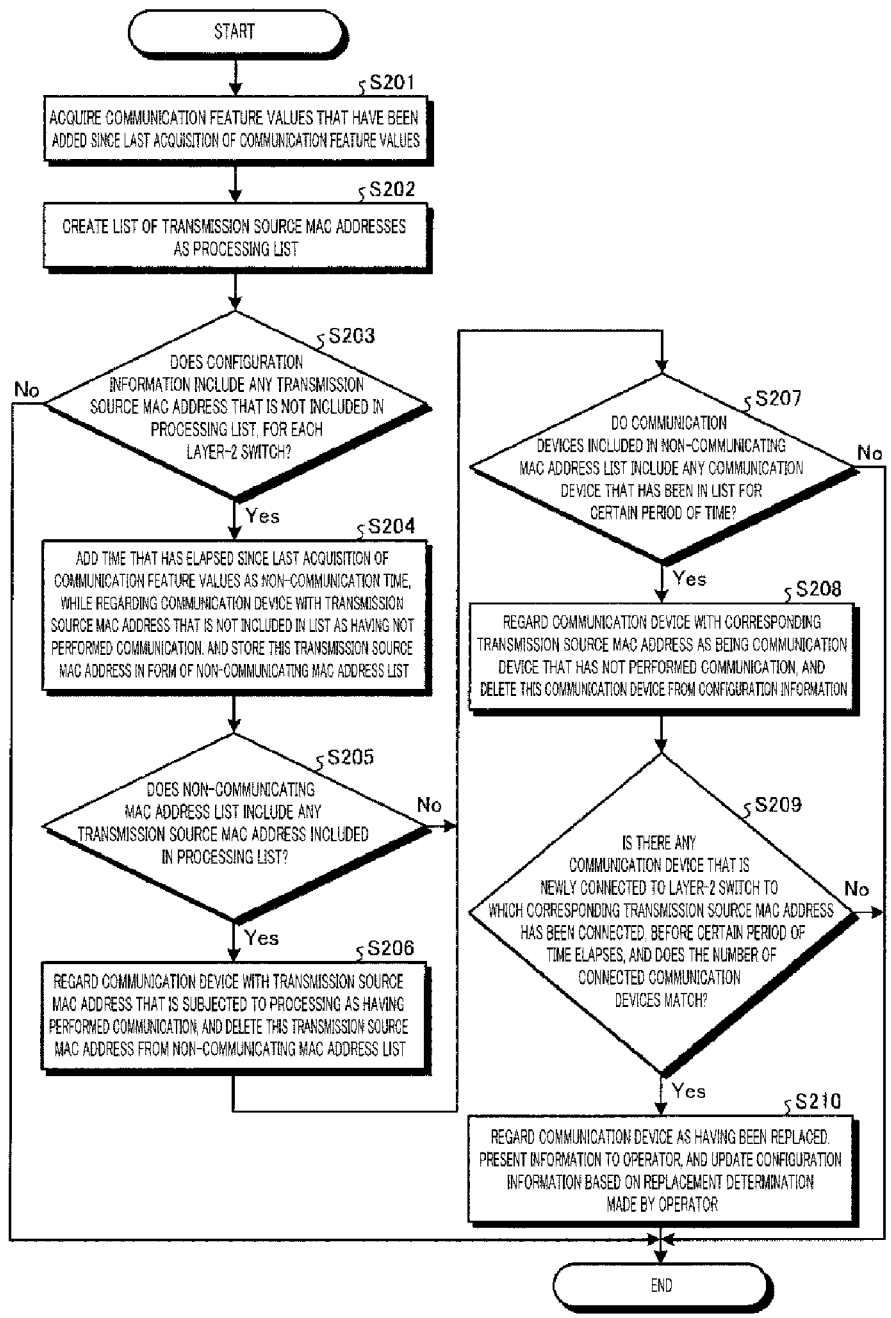
FIG. 10 is a flowchart illustrating disconnection/replacement determination processing performed by the anomaly detection device according to the first embodiment.

The list storing unit 324 also stores a processing list, which indicates transmission source MAC addresses included in the acquired communication feature values, as a determination target in disconnection/replacement determination processing (see FIG. 10). For example, in the processing list, the "switch IDs", which are IDs of the layer-2 switches 50, and the "transmission source MAC addresses" are stored in association with each other, as shown as an example in FIG. 6. FIG. 6 shows an example of the processing list.

The list storing unit 324 also stores a non-communicating MAC address list, which indicates non-communicating MAC addresses that are MAC addresses of communication devices 10 that is not communicating. For example, in the non-communicating MAC address list, a non-communicating time is stored in association with each transmission source MAC address. FIG. 7 shows an example of the non-communicating MAC address list.

The configuration information storing unit 325 stores configuration information that at least includes information regarding the connection state of the communication devices 10. For example, this configuration information includes various kinds of information regarding a network configuration, including the layer-2 switches 50 to which the respective communication devices 10 directly connect, the names of networks to which the layer-2 switches 50 belongs, and the like.

[Processing Flow of Anomaly Detection Device]

Next, a flow of processing performed by the anomaly detection device 30 according to the first embodiment will be described with reference to FIGS. 8 to 10. FIGS. 8 and 9 show a flowchart illustrating connection processing performed by the anomaly detection device according to the first embodiment. FIG. 10 is a flowchart illustrating disconnection/replacement determination processing performed by the anomaly detection device according to the first embodiment.

First, connection processing performed by the anomaly detection device 30 will be described with reference to FIGS. 8 and 9. Note that connection processing performed by the anomaly detection device 30 is processing that is regularly performed at predetermined time intervals (e.g. every one minute). As shown in FIGS. 8 and 9, the acquisition unit 313 of the anomaly detection device 30 acquires communication feature values that have been added since the last acquisition (step S101), and creates a list of transmission source MAC addresses (step S102).

The acquisition unit 313 then determines, for each layer-2 switch, whether or not there is any transmission source MAC address that appears for the first time (step S103). If there is no transmission source MAC address that appears for the first time (No in step S103), the processing ends. If there are some transmission source MAC address that appear for the first time (Yes in step S103), the acquisition unit 313 updates the transmission source MAC address list to a list that only includes the transmission source MAC addresses that appear for the first time (step S104).

Subsequently, the acquisition unit 313 creates a connection determination list of the transmission MAC addresses, as newly-connected transmission source MAC addresses (step S105). Then, the calculation unit 314 calculates the total values of the number of transmitted and received packets and of the number of bytes, for each transmission source MAC address and for each layer-2 switch 50 (step S106), and stores, in the connection determination list, the total values of the number of transmitted and received packets and of the number of bytes for each layer-2 switch 50, with each transmission source MAC address as a key (step S107).

Then, the determination unit 315 determines whether or not there is any transmission source MAC address that has not been processed in the connection determination list (step S108). If there is no transmission source MAC address for which processing has not been performed (No in step S108), the processing ends as-is. If there are some transmission source MAC addresses that have not been processed (Yes in step S108), the determination unit 315 acquires one transmission source MAC address that has not been processed from the connection determination list (step S109).

Subsequently, the determination unit 315 acquires, from the connection determination list, the total values of the number of transmitted and received packets and of the number of bytes at the transmission source MAC address that is subjected to the processing, for each layer-2 switch 50 (step S110). The determination unit 315 then determines a layer-2 switch 50 whose number of packets and number of bytes both take the largest values as a layer-2 switch 50 that is connected, and temporarily stores this layer-2 switch 50 (step S111). Note that, if a layer-2 switch 50 whose number of packets takes the largest value differs from a layer-2 switch 50 whose number of bytes takes the largest value, for example, the determination unit 315 may automatically decide, under a predetermined condition, which of these layer-2 switches 50 is to be determined as a connected one, or may have a user to make the determination.

Next, the determination unit 315 determines whether or not the transmission source MAC address that is subjected to the processing was connected to another layer-2 switch 50 in the past (step S112). If, as a result, the transmission source MAC address was not connected to another layer-2 switch 50 in the past (No in step S112), the determination unit 315 updates the configuration information while regarding the communication device 10 with the transmission source MAC address that is currently subjected to the processing as being newly connected to the determined layer-2 switch 50 (step S113), and returns to processing in step S108.

If the transmission source MAC address was connected to another layer-2 switch 50 in the past (Yes in step S112), the determination unit 315 updates configuration information regarding the layer-2 switch 50 that was connected in the past, while regarding the communication device with the transmission source MAC address that is currently subjected to the processing as having been moved and disconnected (step S114). The determination unit 315 then updates configuration information while regarding the communication device 10 with the transmission source MAC address that is currently subjected to the processing as having been moved and connected to the determined layer-2 switch 50 (step S115), and returns to processing in step S108.

Subsequently, disconnection/replacement determination processing performed by the anomaly detection device 30 will be described with reference to FIG. 10. Note that disconnection/replacement processing performed by the anomaly detection device 30 is processing that is regularly performed at predetermined time intervals (e.g. every one minute). As shown in FIG. 10, the acquisition unit 313 of the anomaly detection device 30 acquires communication feature values that have been added since the last acquisition (step S201), and creates a list of transmission source MAC addresses as a processing list (step S202).

Then, the counting unit 316 determines, for each layer-2 switch, whether or not configuration information includes any transmission source MAC address that is not included in the processing list (step S203). If, as a result, the counting unit 316 determines, for each layer-2 switch, that the configuration information does not include any transmission source MAC address that is not included in the processing list (No in step S203), the processing ends.

If the counting unit 316 determines, for each layer-2 switch, that the configuration information includes a transmission source MAC address that is not included in the processing list (Yes in step S203), the counting unit 316 adds a time that has elapsed since the last acquisition of communication feature values as a non-communicating time, while regarding a communication device 10 with the transmission source MAC address that is not included in the list as being a communication device 10 that has not performed communication, and stores this transmission source MAC address in the form of a non-communicating MAC address list (step S204).

Then, the determination unit 315 determines whether or not the non-communicating MAC address list includes any transmission source MAC address that is included in the processing list (step S205). If there is no transmission source MAC address that is included in the processing list (No in step S205), the determination unit 315 proceeds to processing in step S207. If the non-communicating MAC address list include a transmission source MAC address that is included in the processing list (Yes in step S205), the determination unit 315 regards the communication device 10 with the transmission source MAC address that is subjected to the processing as having performed communication, and deletes this transmission source MAC address from the non-communicating MAC address list (step S206).

The determination unit 315 then determines whether or not the non-communicating MAC address list includes any communication device whose non-communicating time has reached a certain period of time (step S207). If the non-communicating MAC address list does not include any communication device whose non-communicating time has reached the certain period of time (No in step S207), the processing ends. If the non-communicating time of any of the communication devices in the non-communicating MAC address list has reached the certain period of time (Yes in step S207), the determination unit 315 regards the communication device 10 with the corresponding transmission source MAC address as being a communication device 10 that has not performed communication, and deletes this communication device 10 from the configuration information (step S208).

The determination unit 315 then determines whether or not there is a communication device 10 that is newly connected to the layer-2 switch 50 to which the corresponding transmission source MAC address has been connected, before a certain period of time elapses, and whether or not the number of connected communication devices 10 matches (step S209). If, as a result, the determination unit 315 determines that there is a communication device 10 that is newly connected before the certain period of time elapses, and the number of connected communication devices 10 matches (Yes in step S209), the determination unit 315 regards a communication device 10 as having been replaced, presents information to an operator, and updates the configuration information based on a replacement determination made by the operator (step S210), and the processing ends. If the determination unit 315 determines that no communication device 10 is newly connected before the certain period of time elapses, or that the number does not match (No in step S209), the processing ends as-is.

Note that, as a method for determining that a communication device 10 has been replaced, other than the aforementioned method of checking whether or not the number matches, a method is also available in which a normal communication pattern of a communication device 10 is identified in advance, and it is determined that the communication device 10 has been replaced if, regarding a layer-2 switch 50 that has been determined as being connected thereto, the connected communication device 10 has a different transmission source MAC address, but there has been no change in the transmitting/receiving IP address, port number, protocol, and flow rate pattern. Furthermore, a method is available in which a port position at which a communication device 10 is connected to a layer-2 switch 50 is identified in advance, and it is determined that replacement has been performed if a new device is connected at the already-connected port position. Furthermore, these determination methods can also be combined.

Effects of First Embodiment

As described above, the anomaly detection device 30 according to the first embodiment acquires communication feature values of the communication devices 10, calculates, for each of the transmission source MAC addresses included in the communication feature values, the total value of the number of transmitted and received packet and the total value of the number of bytes for each of the layer-2 switches 50 that are connected to the communication device 10, and determines, for each of the transmission source MAC addresses, that the communication device 10 corresponding to the transmission source MAC address is connected to a layer-2 switch 50 whose total value of the number of transmitted and received packets or total value of the number of bytes is the largest. This configuration makes it possible to appropriately and readily understand the connection state of the communication devices 10.

That is to say, the anomaly detection device 30 calculates the total values of the number of transmitted and received packets and of the number of bytes for each transmission source MAC address and for each layer-2 switch 50, compares the total values between the layer-2 switches, and determines the layer-2 switch with the largest value as being a layer-2 switch to which the communication device 10 is connected. Thus, the connection state of the communication devices 10 can be determined. Also, the anomaly detection device 30 can identify whether a communication device 10 is connected, moved to another network, is disconnected, or is replaced.

[System Configuration Etc.]

The constituent elements of the devices shown in the figures are functional and conceptual elements, and are not necessarily required to be physically configured as shown in the figures. That is to say, specific modes of distribution and integration of the devices are not limited to those shown in the figures, and all or some of the devices can be functionally or physically distributed or integrated in any unit, in accordance with various loads, usage situations, or the like. Furthermore, all or some of the processing functions performed by the devices may be realized by a CPU and a program that is analyzed and executed by the CPU, or may be realized as hardware using wired logic.

Of the processing described in the present embodiment, the entire or part of the processing that has been described as being automatically performed may be manually performed, or the entire or part of the processing that has been described as being manually performed may be automatically performed, using a known method. In addition, processing procedures, control procedures, specific names, and information including various data and parameters described in the above description and the figures may be changed in any manner, unless otherwise stated.

[Program]

The functionality of the anomaly detection device 30 described in the above embodiment can be implemented by installing a program that realizes the functionality in a desired information processor (computer). For example, an information processor can be caused to function as the anomaly detection device 30 by causing the information processor to execute the aforementioned program, which is provided as package software or online software. The information processor mentioned here may be a desktop or laptop personal computer, a rack-mounted server computer, or the like. In addition, the scope of the information processor may include a gateway device, a mobile communication terminal such as a smartphone, a mobile phone, or a PHS (Personal Handyphone System), a PDA (Personal Digital Assistants), and the like. The anomaly detection device 30 may also be mounted in a cloud server.

Figure 11:
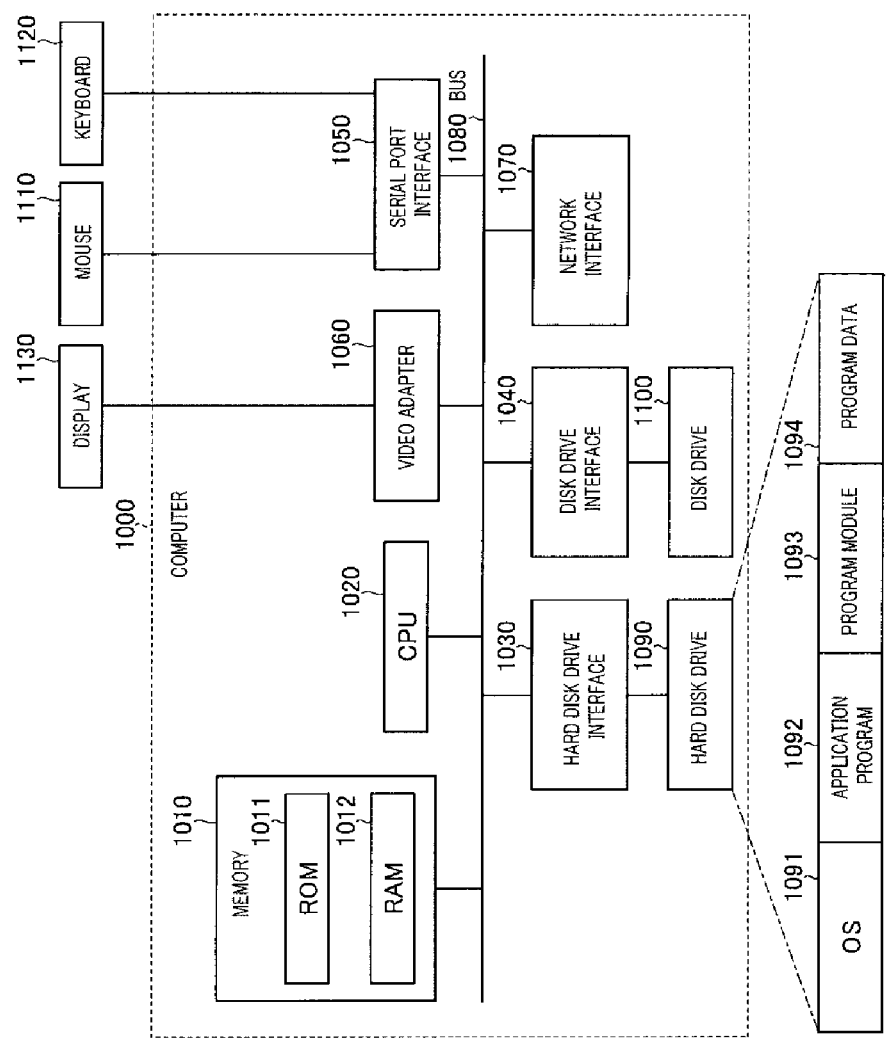
FIG. 11 shows a computer that executes an anomaly detection program.

An example of a computer that executes the aforementioned program (anomaly detection program) will be described with reference to FIG. 11. As shown in FIG. 11, a computer 1000 has, for example, a memory 1010, a CPU 1020, a hard disk drive interface 1030, a disk drive interface 1040, a serial port interface 1050, a video adapter 1060, and a network interface 1070. These parts are connected by a bus 1080.

The memory 1010 includes a ROM (Read Only Memory) 1011 and a RAM (Random Access Memory) 1012. The ROM 1011 stores a boot program such as a BIOS (Basic Input Output System), for example. The hard disk drive interface 1030 is connected to a hard disk drive 1090. The disk drive interface 1040 is connected to a disk drive 1100. A removable storage medium, such as a magnetic disk or an optical disk, is inserted into the disk drive 1100, for example. A mouse 1110 and a keyboard 1120, for example, are connected to the serial port interface 1050. A display 1130, for example, is connected to the video adapter 1060.

Here, as shown in FIG. 11, the hard disk drive 1090 stores an OS 1091, an application program 1092, a program module 1093, and program data 1094, for example. Various data and information described in the above-described embodiment are stored in the hard disk drive 1090 and the memory 1010, for example.

The CPU 1020 loads a program module 1093 and program data 1094, which are stored in the hard disk drive 1090 to the RAM 1012, as needed, and performs the above-described procedures.

Note that the program module 1093 and the program data 1094 according to the above-described anomaly detection program are not limited to being stored in the hard disk drive 1090, and may be, for example, stored in a removable storage medium and loaded via the disk drive 1100 or the like, by the CPU 1020. Alternatively, the program module 1093 and the program data 1094 according to the aforementioned program may be stored in another computer that is connected via a network such as a LAN or a WAN (Wide Area Network), and loaded via the network interface 1070 by the CPU 1020.

REFERENCE SIGNS LIST

10, 10A to 10I Communication device
20A, 20B Gateway device
30 Anomaly detection device
40 Server
50A to 50C Layer-2 switch
60A, 60B Router
100 Anomaly detection system
311 Learning unit
312 Anomaly detection unit
313 Acquisition unit
314 Calculation unit
315 Determination unit
316 Counting unit
317 Input unit
318 Display unit
319 Stored data retrieval unit
320 Communication unit
321 OS
322 Learning data storing unit
323 Communication feature value storing unit
324 List storing unit
325 Configuration information storing unit

The invention claimed is:

1. An anomaly detection device comprising:
a memory; and
processing circuitry coupled to the memory and configured to:
acquire communication feature values of communication devices,
calculate, for each transmission source MAC address included in the communication feature values acquired, a total value of a number of transmitted and received packets or a total value of a number of bytes, for each layer-2 switch connected to a corresponding communication device, and
determine, for each transmission source MAC address, that a communication device corresponding to the transmission source MAC address is connected to a layer-2 switch whose total value of the number of transmitted and received packets or total value of the number of bytes calculated is the largest.

2. The anomaly detection device according to claim 1, wherein the processing circuitry is further configured to:
if there is a transmission source MAC address that is not included in the communication feature values acquired but is included in configuration information that includes information regarding a connection state of the communication devices, count a non-communicating time for this transmission source MAC address, and
if the non-communicating time counted has reached a predetermined time, determine that the communication device has stopped communication.

3. The anomaly detection device according to claim 2, wherein the processing circuitry is further configured to, if a communication device is newly connected to a layer-2 switch that has been connected to a communication device for which it is determined that communication has not been performed, before the non-communicating time counted reaches the predetermined time, and a number of communication devices for which it is determined that communication has not been performed matches a number of newly-connected communication devices, determine that a communication device has been replaced.

4. The anomaly detection device according to claim 1, wherein the processing circuitry is further configured to update configuration information that includes information regarding a connection state of the communication devices, in accordance with a determination result.

5. The anomaly detection device according to claim 1, wherein the processing circuitry is further configured to:
detect an anomaly in the communication devices, based on communication feature values obtained while the communication devices are normally operating, and
if an anomaly in a communication device, of the communication devices, is detected, display a network corresponding to a layer-2 switch to which the communication device is connected as a network to which the communication device in which the anomaly has been detected belongs.

6. An anomaly detection method comprising:
acquiring communication feature values of communication devices;
calculating, for each transmission source MAC address included in the communication feature values acquired, a total value of a number of transmitted and received packets or a total value of a number of bytes, for each layer-2 switch connected to a corresponding communication device; and
determining, for each transmission source MAC address, that a communication device corresponding to the transmission source MAC address is connected to a layer-2 switch whose total value of the number of transmitted and received packets or total value of the number of bytes calculated is the largest, by processing circuitry.

7. A non-transitory computer-readable recording medium storing therein an anomaly detection program that causes a computer to execute a process comprising:
acquiring communication feature values of communication devices;
calculating, for each transmission source MAC address included in the communication feature values acquired, a total value of a number of transmitted and received packets or a total value of a number of bytes, for each layer-2 switch connected to a corresponding communication device; and
determining, for each transmission source MAC address, that a communication device corresponding to the transmission source MAC address is connected to a layer-2 switch whose total value of the number of transmitted and received packets or total value of the number of bytes calculated is the largest.

\* \* \* \* \*